R. S. WESTERVELT.
TURNING-IN AND TUCKING-IN MACHINE.
APPLICATION FILED OCT. 26, 1917.

1,280,919.

Patented Oct. 8, 1918.
5 SHEETS—SHEET 1.

WITNESSES:

INVENTOR:
Raymond S. Westervelt,
BY Fraentzel and Richards
ATTORNEYS.

R. S. WESTERVELT.
TURNING-IN AND TUCKING-IN MACHINE.
APPLICATION FILED OCT. 26, 1917.

1,280,919.

Patented Oct. 8, 1918.
5 SHEETS—SHEET 2.

WITNESSES:

INVENTOR:
Raymond S. Westervelt,
BY
Fraintzel and Richards,
ATTORNEYS

R. S. WESTERVELT.
TURNING-IN AND TUCKING-IN MACHINE.
APPLICATION FILED OCT. 26, 1917.

1,280,919.

Patented Oct. 8, 1918.
5 SHEETS—SHEET 3.

INVENTOR:
Raymond S. Westervelt,
BY
Fraentzel and Richards
ATTORNEYS

UNITED STATES PATENT OFFICE.

RAYMOND S. WESTERVELT, OF OLNEY, PENNSYLVANIA.

TURNING-IN AND TUCKING-IN MACHINE.

1,280,919.  Specification of Letters Patent.  Patented Oct. 8, 1918.

Application filed October 26, 1917. Serial No. 198,712.

*To all whom it may concern:*

Be it known that I, RAYMOND S. WESTERVELT, a citizen of the United States, residing at Olney, in the county of Philadelphia and State of Pennsylvania, have invented certain new and useful Improvements in Turning-In and Tucking-In Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in that class of machines employed for turning-in or tucking-in the extending marginal edge-portions of the paper-coverings, wrappers, or envelops applied to the outer faces of the bodies and the covers of card-board and other boxes; and, the invention has reference, more particularly, to a novel and simply constructed machine for the purposes above stated which may be used as a single machine by one operator for turning-in or tucking-in the marginal edge-portions of the paper-coverings, wrappers, or envelops of the card-board or other boxes, either the body or cover thereof, the operator working either upon one or two bodies or covers at one and the same time, which bodies or covers may be the same in shape and sizes, or may vary; and, the machine being, furthermore, adapted for use by two operators during the turning-in or tucking-in operations.

The present invention, therefore, has for its principal object to provide a novel, simple and efficiently operating turning-in or tucking-in machine of the general character hereinafter more fully set forth and for the purposes heretofore stated; and the invention has for its further object to provide such a machine or apparatus with one or more adjustable tables, whereby the machine is applicable to boxes and covers therefor of different heights.

The invention has for its further object to provide in connection with the novel folding-in or tucking-in machine, a novel and simply constructed tucking-in head, and especially one, the tucking-in mechanism of which readily and automatically adapts itself to boxes and covers of varying thicknesses so that the turn or tuck will be properly made.

The present invention has for its further object to provide an improved paper box turning-in or tucking-in machine to be used in conjunction with any form and style of standard stripping or banding or covering machine, and furthermore to provide in connection therewith two universally adjustable and self-contained heads set at right angles and operating each a turning-in or folding-in finger, said fingers working conjointly but slightly in advance of each other so as to insure a proper fold in the corner of the box or cover.

Other objects of the present invention not at this time more particularly enumerated will be fully understood from the following detailed description of the present invention.

With the various objects of the present invention in view, the said invention consists, primarily, in the novel turning-in or tucking-in machine hereinafter set forth; and, the invention consists, furthermore, in the novel arrangements and combinations of the various devices and parts, as well as in the details of the construction of the said parts, all of which will be more fully described in the following specification, and then finally embodied in the clauses of the claims which are appended to and which forms an essential part of the said specification.

The invention is clearly illustrated in the accompanying drawings, in which:—

Figs. $4^a$, $4^b$ and $4^c$ are views, similar to Fig. 4, of the parts represented in said Fig. 4, Fig. $4^a$ showing the parts in their normal initial positions, before starting the operation of the machine, Fig. $4^b$ representing the parts immediately before their final finishing positions, and Fig. $4^c$ showing the parts in their final finishing positions, in the act of pressing the marginal edge or flap of the paper-covering against the inside of the box or cover.

Similar characters of reference are employed in all of the said above described views, to indicate corresponding parts.

Figure 1:
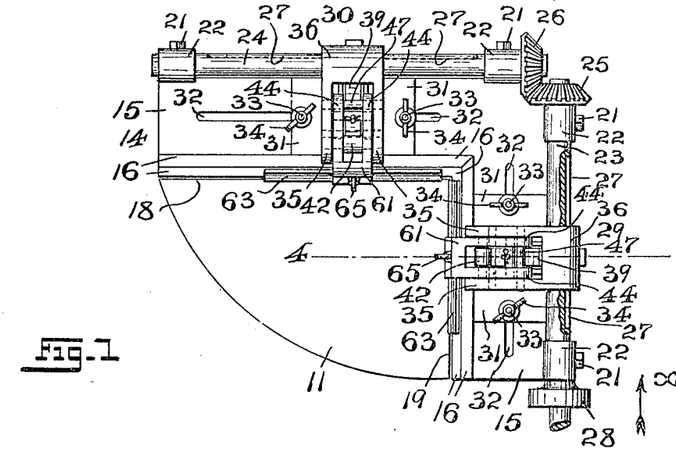
Figure 1 is a top or plan view of a single turning-in or tucking-in machine showing one embodiment of the principles of the present invention.
Figure 2:
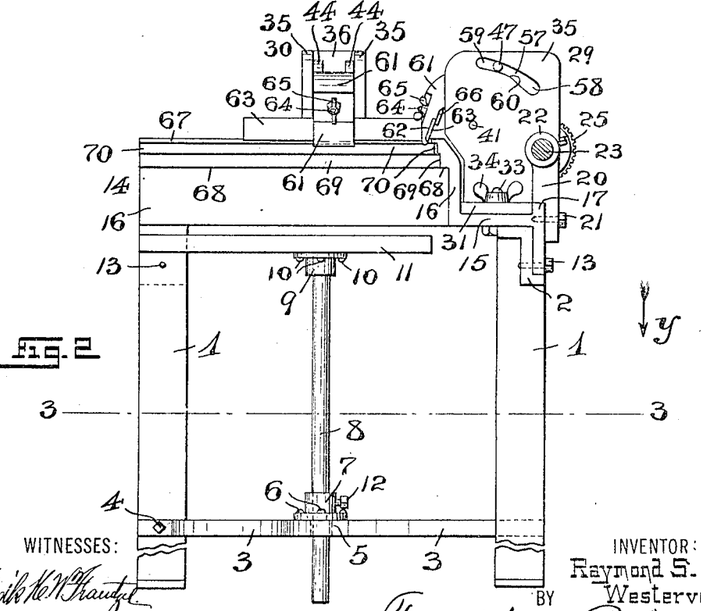
Fig. 2 is a side elevation of the same, looking in the direction of the arrow $x$ in said Fig. 1.
Figure 3:
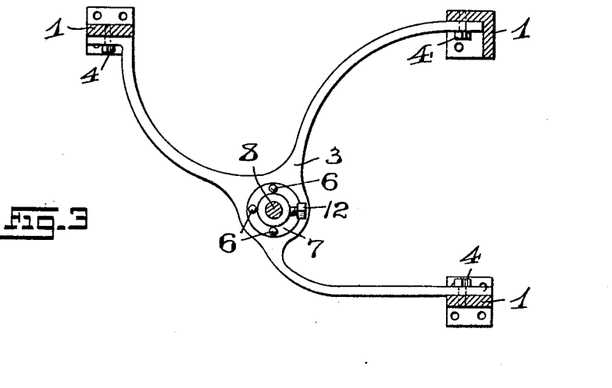
Fig. 3 is a horizontal sectional representation, said section being taken on line 3—3 in said Fig. 2, looking in the direction of the arrow $y$.

Referring now to the several figures of the drawings, and more particularly to Figs. 1 to 4 inclusive, the reference-character 1 indicates suitable legs or standards, usually three of them being employed, as indicated in Fig. 3 of the drawings, and each having a portion, as 2, see Fig. 2 of the drawings, upon which is mounted and secured a suitably shaped supporting frame or bed for the turning-in or tucking-in heads and the mechanism for actuating the latter, all of which will presently be more particularly described as to the details of their construction and operation.

The said three legs or standards 1 are suitably connected so as to provide proper rigidity, by a spider or frame-work, as 3, secured to the respective legs or standards by means of bolts or tap-screw, as 4, or in any other suitable manner.

The central portion of the spider 3 has a suitable hole or opening 5, as indicated in dotted outline in Fig. 2 of the drawings, and above which hole or opening is secured by means of bolts 6, or otherwise, a tubular hub 7, or the like. Movable vertically in said hole or opening 5 and the hub 7 is a rod or stem 8, provided at its upper end-portion with a hub 9, secured by means of tap-bolts or screws, as 10, to the lower surface or bottom of a suitably shaped table 11.

The said rod or stem 8 and the table 11 carried thereby, are adapted to be maintained in their adjusted positions, by means of a set-screw 12 employed in connection with the hub 7, as shown in Figs. 2 and 3 of the drawings. It will be evident, however, that any other suitable means of adjustment may be employed, if desired.

The herein-above mentioned supporting frame or bed which is mounted upon the supporting portions 2 of the legs or standards 1, by means of tap-bolts 13, or other suitable means, is indicated generally by the reference-character 14, being usually made of right-angular configuration, comprising the main body-portions 15 and the angularly disposed guide-flanges 16 and 17. As shown, the table 11 is movably disposed within the angle formed by the pair of guide-flanges 16, having the right-angled or squared marginal edges 18 and 19, substantially in registration with the right-angled flanges 16, as indicated in Figs. 1, 2 and 4 of the drawings.

Extending upwardly from the right-angled or squared main body-portions 15, at suitable points, are bearing-brackets or supports, as 20, said supports being secured in position by means of tap-bolts 21 and each bracket or support having a bearing-portion 22. Rotatably mounted in the respective bearing-portions 22 are shafts or spindles 23 and 24 which are respectively provided with the intermeshing miter or bevel wheels 25 and 26, substantially as indicated in Fig. 1 of the drawings. Each shaft or spindle is also provided with a key-way, as 27, see Fig. 4, and one of said shafts may be provided with a driving wheel 28 for the application of power to the same, and for the purposes of driving the said shafts, as will be clearly evident.

Slidably mounted upon each shaft or spindle 23 and 24, so as to be capable of proper adjustment with relation to sides of the paper-boxes or covers, are a pair of self-contained turning-in or tucking-in heads, generally designated by the reference-characters 29 and 30, each head comprising a suitably-formed base 31 placed upon the main body-portion 15 and between the guide-flanges 16 and 17, substantially as shown, said bases 31 being placed above correspondingly located slots or elongated openings 32 with which the main body-portions 15 are provided, and said heads being adapted to be secured or fixed in their adjusted positions by means of bolts 33 which are passed through said slots or openings 32 and through properly located holes or perforations in the bases 31, suitable thumb-nuts 34, or the like, being used with each bolt 33 for positively maintaining the said heads in their adjusted positions, as will be clearly evident.

Figure 4:
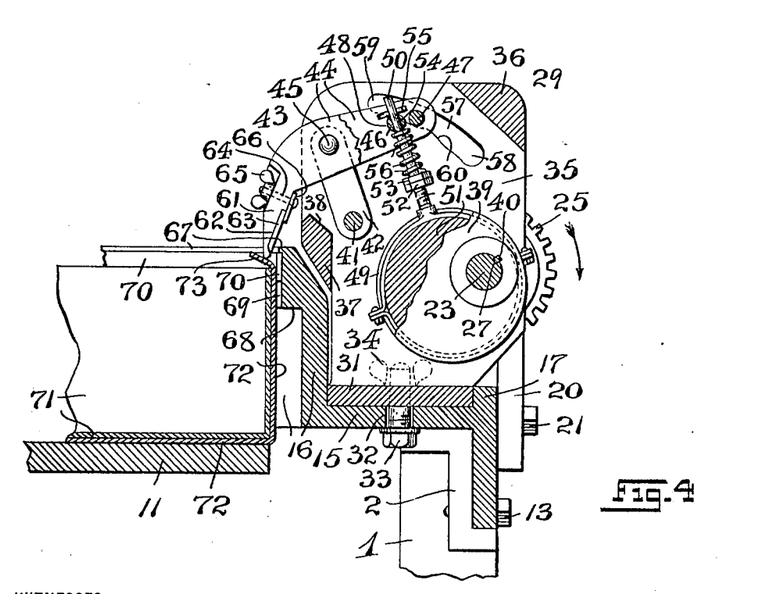
Fig. 4 is a vertical section taken on line 4—4 in said Fig. 1, said view being made on an enlarged scale.
Figure 4A:
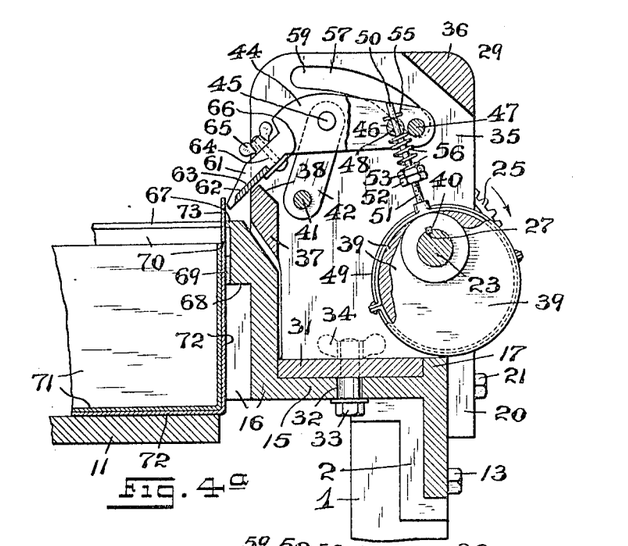

Referring now more particularly to Fig. 4 of the drawings, it will be noted that the base 31 of each head is provided with a pair of upwardly extending side-members or walls, as 35, which are connected at the top by a brace 36, and at their front edges, at a suitable location, by another brace 37, having an inclined face or surface, as 38, the purpose of which will be presently more fully set forth. The said side-members or walls 35 are also provided at suitable locations with suitable holes corresponding to the diameters of the respective shafts or spindles 23 and 24, for mounting said shafts or spindles, as will be clearly evident. Mounted upon that portion of each shaft or spindle which extends across the space between each pair of side-members or walls 35 is an eccentric or cam-member 39, which is secured to the shaft-portion by means of a key 40, so as to turn with the shaft or spindle. Each key 40 also extends into the key-way of the respective shaft or spindle, so that the slidable movements of the respective heads are possible, the respective keys being held in place by having their ends in contact with the opposite inner faces of the said side-members or walls 35. Extending across the space between the said side-members or walls 35 is a pintle 41 upon which is pivotally mounted a lever or link 42, the upper portion of said lever or link 42 extending between the arms 44 of a yoke 43, termed the turning-in or tucking-in finger, said upper portion of the said link or lever 42 being pivotally connected with a pivot-pin 45 which extends across the space between said arms 44 and has its end-portions operatively connected with the respective arms 44. The rearwardly extending portions of said arms 44 are also connected by suitably disposed pins 46 and 47, the pin 46 having its end portions oscillatorily mounted in suitable perforations or bearing-portions 48 in the respective arms 44. Extending from the strap 49 of the previously mentioned eccentric or cam-member 39 is a stem or rod 50 which is preferably screw-threaded, as at 51, and has a pair of adjusting lock-nuts 52 and 53 thereon, as shown. At its lowest stroke or finishing operation, the position of the lever or link 42 is such that its further movement is arrested by contact with the previously mentioned inclined face or surface 38, the brace thus acting as a stop and preventing in consequence thereof the turning-in or tucking-in finger from going too far and preventing thereby any damage to the side of the box or cover, as will be clearly evident.

Figures 4B, 4C:
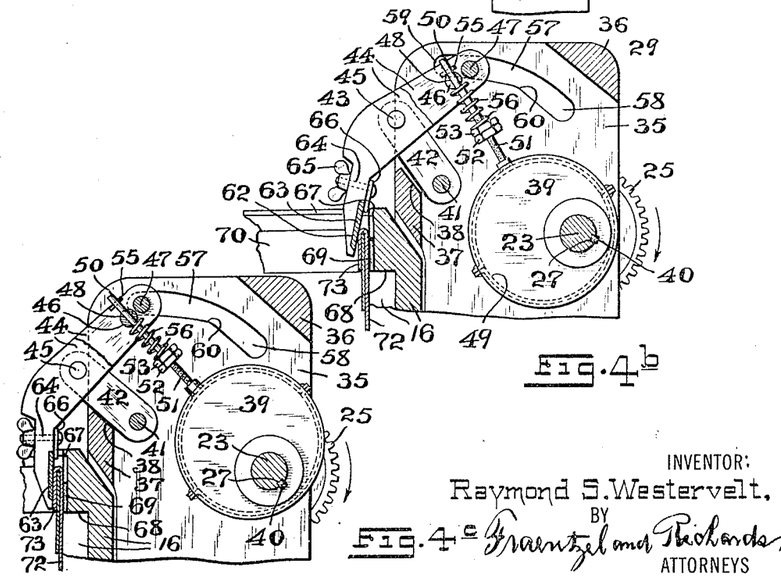

The upper portion of the said stem or rod 50 extends into and through a hole or opening 54 in the oscillating pin 46, and is retained in position by a suitable pin 55, or other suitable retaining means. Surrounding that portion of the stem or rod 50 between said pin 46 and the nut 53 is a coiled cushioning spring 56. As shown, the previously mentioned side-members or walls 35 are formed with properly located arc-shaped openings, as 57, forming suitable camways, into which the end-portions of the pin 47 of each head extend, and are movably disposed therein, so as to give proper oscillatory swinging motion to the "finger" when the mechanism is set in motion. Each camway thus provided, is preferably of greater width, as at 58, than at 59, providing a slight offset at 60, the purpose of which is to throw the turning-in or tucking-in edge of the "finger" away from the edge of the box or cover and to allow it to move over the edge of the same from the outside to the inside of the box-body, or the cover, and fully clearing the upper edge of the box or cover. In passing along the remaining part of the cam-slot to the point 59, the movement of the pin 47 causes the parts to assume their final finishing positions in the act of pressing the marginal portion or flap of the paper, covering positively against the inside of the box or cover, as shown in Fig. 4ᶜ of the drawings. At its turning-in or tucking-in edge, the "finger" has a solid portion 61 connecting the arms 44, said portion 61 being suitably recessed, as at 62, upon its rear side, for the reception of a laterally extending turning-in and smoothing-out bar 63 of the proper length, such bar being suitably affixed in place by a bolt 64 and nut 65, and a clamp 66, substantially as shown in said Fig. 4 of the drawings. This arrangement enables the operator to readily remove the bar 63 for adjustment in the said recessed portion 62 of another bar, either of greater or shorter length, according to the size of the box or rather the length of its side over the edge of which the flap of the paper covering is to be turned and smoothed out. Other securing means may be employed, if desired, and as will be clearly evident. As shown, the previously-mentioned guide-flanges 16 are preferably formed with off-set portions 67 and 68, and suitably mounted upon the vertically disposed surface-portions 69, directly beneath the off-set portions 67 are soft cushion-like members or elements 70, usually of felt, rubber, or the like.

In Fig. 4 of the drawings, the reference-character 71 indicates a fragmentary portion of the body of a box, 72 the paper-covering thereof, and 73 the marginal portions or flaps of the said covering which are to be turned-in or tucked-in to lie flat against the inner faces of the sides of the paper box.

Having in the foregoing described in a general manner, a single turning-in or tucking-in machine, and the heads therefor for turning-in or tucking-in the marginal portions or flaps of the paper coverings for the bodies of boxes or for the covers thereof, it will be evident that the operation of the mechanism and the turning-in or tucking-in steps will be readily understood from an inspection of the several figures of the drawings, and any further description of the same is therefore deemed unnecessary, except to state that when the box-body or cover is placed upon the table 11 of the machine, so as to rest in the angle formed by the two body-portions 15 and the respective guide-flanges 16, the two "fingers" operating simultaneously on two sides of the box-body or cover, one to produce the turn-in or tuck-in on the length of the box-body or cover, and the other to produce the turn-in or tuck-in on the width of the box-body or arm, the parts working conjointly, it being preferable, however, that the eccentrics being set in such a manner that the one "finger" will operate slightly in advance of the other "finger" so as to insure a proper fold to be made in the box-body or the cover.

Furthermore, it may also be preferable to make the cam-ways or slots 57 of the general conformation here shown, or of a similar conformation, so that the inner or rear face-portion of the turning-in or tucking-in member of each "finger", in turning-in or tucking-in the edge of the paper, will readily pass from the outside to the inside of the box-body or cover, clearing the upper edges or top of the box-body or cover, then descending angularly down into the box-body or cover, and moving toward the inner face-portions of the box-body or cover, finally tipping perpendicularly or vertically and approaching the inner face-portions of the box-body or cover in that position, so as to force the turned-in or tucked-in edge-portions of the covering flat against the inner face-portions of the box-body or cover.

Figure 5:
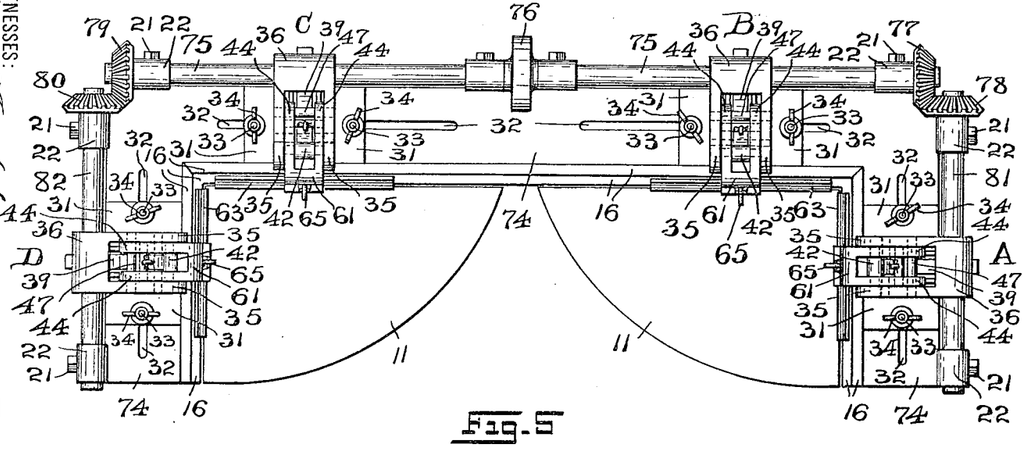
Figs. 5 and 6 are top or plan views of double or multiple turning-in or tucking-in machines adapted to be operated by one or two operators, but both machines represented in said Figs. 5 and 6, being made according to and embodying the principles of the present invention.

In Fig. 5 I have shown a double or multiple turning-in or tucking-in machine, provided with a double pair or set of turning-in or tucking-in heads and "fingers" A, B, C and D of the construction herein-above described, the same being adjustably mounted upon a supporting frame or bed in the form of a main body 74, of the configuration substantially as shown. The remaining parts and portions of this main body 74 and the supporting legs or standards therefor are the same as those described in connection with the construction illustrated in Figs. 1 to 4 inclusive, but with this form of machine I employ two separately adjustable box-supporting tables 11, thus enabling two operators to work at the machine on box-bodies or covers of different sizes, as will be clearly evident. In conjunction with the various heads A, B, C and D, I employ a main driving shaft 75 driven from a pulley 76, said shaft being provided at its ends with miter or bevel-gears 77 and 78 which, respectively, mesh with miter or bevel-gears 79 and 80, respectively mounted upon and secured upon another set of operating shafts 81 and 82.

Figure 6:
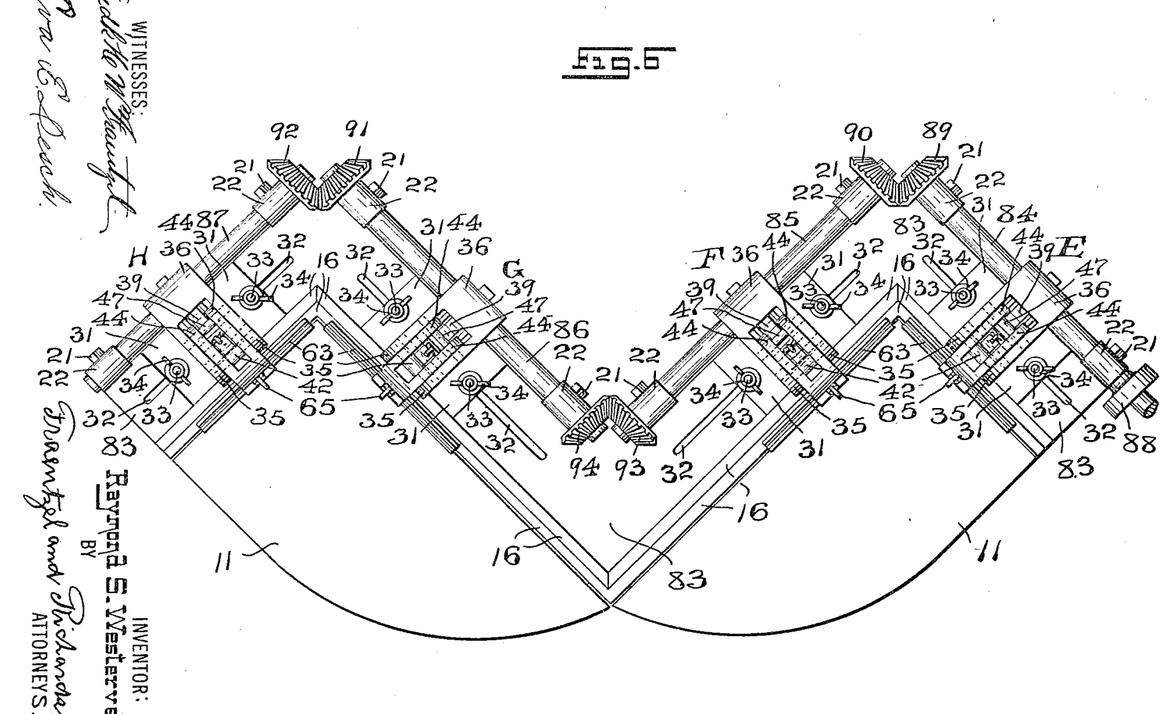

In lieu of the form of main body 74 in said Fig. 5, I may employ a main body 83, of the general configuration represented in Fig. 6 of the drawings. In conjunction with this form of main body 83, I may also employ a double pair or set of turning-in or tucking-in heads, as E, F, G and H of the construction previously described. The remaining parts and portions of the main body 83, as well as the legs or standards for the same, are the same as those described in connection with the constructions illustrated in Figs. 1 to 5 inclusive. With this form of duplex or multiple turning-in or tucking-in machine, I also employ two separately adjustable box-supporting tables 11. In conjunction with the various heads E, F, G and H, I employ the shafts 84, 85, 86 and 87, the shaft 84 being operated from a pulley-wheel 88 which is secured upon said shaft. Power is communicated from said shaft 84 to the shaft 85, by means of intermeshing miter or bevel-gears 89 and 90, from said shaft 85 to the shaft 86, by means of intermeshing miter or bevel-gears 93 and 94, and from said shaft 86 to the shaft 87, by means of intermeshing miter or bevel-gears 91 and 92, all of which will be clearly evident from an inspection of said Fig. 6 of the drawings. With the form of turning-in or tucking-in machine illustrated in said Fig. 5 of the drawings, I have provided a double or multiple machine which may be operated by either one or two operators, and with which one operator can place and work upon two box-bodies or covers of different sizes at one and the same time, and turn-in or tuck-in one end and one side at one time with the different boxes or covers placed upon the respective tables. The form of machine illustrated in said Fig. 5, as well as the machine shown in said Fig. 6, is admirably adapted for use with two operators, each operator using a table for the turning-in or tucking-in steps in conjunction with any standard stripping, or banding, or covering machine located at either side of the turning-in or tucking-in machine.

While in the foregoing description and in the accompanying drawings I have presented an embodiment illustrating the principles of my present invention, I am fully aware that various changes may be made in the general arrangements and combinations of the several devices and parts, as well as in the details of the construction of the said parts, without departing from the scope of the present invention as set forth in the foregoing specification, and as defined in the clauses of the claims which are appended to the said specification. Hence, I do not limit my present invention to the exact arrangements and combinations of the several devices and parts as described in the said specification, nor do I confine myself to the exact details of the construction of the said parts, as illustrated in the accompanying drawings.

I claim:—

1. A paper-box turning-in or tucking-in machine comprising an angularly formed tucking-in finger supporting bed, heads provided with tucking-in fingers mounted upon said bed, and a work-supporting table beneath said fingers, said table conforming to and located within the included angle of said bed.

2. A paper-box turning-in or tucking-in machine comprising an angularly formed tucking-in finger supporting bed, heads provided with tucking-in fingers mounted upon said bed, a work-supporting table beneath said fingers, said table conforming to and located within the included angle of said bed, and means connected with the table for vertical adjustment of said table.

3. A paper-box turning-in or tucking-in machine comprising an angularly formed tucking-in finger supporting bed, heads slidably mounted toward the included angle of said bed for adjustment upon said bed, said heads being provided with tucking-in fingers, and a work-supporting table beneath said fingers, said table conforming to and located within the included angle of said bed.

4. A paper-box turning-in or tucking-in machine comprising an angularly formed tucking-in finger supporting bed, heads slidably mounted toward the included angle of said bed for adjustment upon said bed, said heads being provided with tucking-in fingers, a work-supporting table beneath said fingers, said table conforming to and located within the included angle of said bed, and means connected with the table for vertical adjustment of said table.

5. A paper-box turning-in or tucking-in machine comprising an angularly formed supporting bed, brackets mounted upon said bed, and a bearing-portion carried by each bracket, shafts mounted in said bearing-portions, intermeshing gears connecting said shafts for conveying the motion of one shaft to another shaft, heads mounted upon said bed, a swinging tucking-in finger connected with each head, means between each shaft and each tucking-in finger for actuating the same, and a table conforming to and located in the angular portion of said bed.

6. A paper-box turning-in or tucking-in machine comprising an angularly formed supporting bed, brackets mounted upon said bed, and a bearing-portion carried by each bracket, shafts mounted in said bearing-portions, intermeshing gears connecting said shafts for conveying the motion of one shaft to another shaft, heads mounted upon said bed, a swinging tucking-in finger connected with each head, means between each shaft and each tucking-in finger for actuating the same, a table conforming to and located in the angular portion of said bed, and means connected with the table for vertical adjustment of said table.

7. A paper-box turning-in or tucking-in machine comprising an angularly formed supporting bed, brackets mounted upon said bed, and a bearing-portion carried by each bracket, shafts mounted in said bearing-portions, intermeshing gears connecting said shafts for conveying the motion of one shaft to another shaft, heads slidably mounted with relation to said shafts and the bed for adjustment upon said bed, a swinging tucking-in finger connected with each head, means between each shaft and each tucking-in finger for actuating the same, and a table conforming to and located in the angular portion of said bed.

8. A paper-box turning-in or tucking-in machine comprising an angularly formed supporting bed, brackets mounted upon said bed, and a bearing-portion carried by each bracket, shafts mounted in said bearing-portions, intermeshing gears connecting said shafts for conveying the motion of one shaft to another shaft, heads slidably mounted with relation to said shafts and the bed for adjustment upon said bed, a swinging tucking-in finger connected with each head, means between each shaft and each tucking-in finger for actuating the same, a table conforming to and located in the angular portion of said bed, and means connected with the table for vertical adjustment of said table.

9. A paper-box turning-in or tucking-in machine comprising an angularly formed supporting bed, brackets mounted upon said bed, and a bearing-portion carried by each bracket, shafts mounted in said bearing-portions, means for actuating said shafts, heads mounted upon said bed, each head comprising a base and a pair of side-walls, a tucking-in finger oscillatorily disposed between said side-walls, an eccentric upon each shaft, means between each eccentric and each tucking-in finger for actuating the same, and a table conforming to and located in the angular portion of said bed.

10. A paper-box turning-in or tucking-in machine comprising an angularly formed supporting bed, brackets mounted upon said bed, and a bearing-portion carried by each bracket, shafts mounted in said bearing-portions, means for actuating said shafts, heads mounted upon said bed, each head comprising a base and a pair of side-walls, a tucking-in finger oscillatorily disposed between said side-walls, an eccentric upon each shaft, means between each eccentric and each tucking-in finger for actuating the same, a table conforming to and located in the angular portion of said bed, and means connected with the table for vertical adjustment of said table.

11. A paper-box turning-in or tucking-in machine comprising an angularly formed supporting bed, brackets mounted upon said bed, and a bearing-portion carried by each bracket, shafts mounted in said bearing-portions, means for actuating said shafts, heads slidably mounted with relation to said shafts and the bed for adjustment upon said bed, each head comprising a base and a pair of side-walls, a tucking-in finger oscillatorily disposed between said side-walls, an eccentric slidably disposed upon each shaft but rotating therewith, means between each eccentric and each tucking-in finger for actuating the same, and a table conforming to and located in the angular portion of said bed.

12. A paper-box turning-in or tucking-in machine comprising an angularly formed supporting bed, brackets mounted upon said bed, and a bearing-portion carried by each bracket, shafts mounted in said bearing-portions, means for actuating said shafts, heads slidably mounted with relation to said shafts and the bed for adjustment upon said bed, each head comprising a base and a pair of side-walls, a tucking-in finger oscillatorily disposed between said side-walls, an eccentric slidably disposed upon each shaft but rotating therewith, means between each eccentric and each tucking-in finger for actuating the same, a table conforming to and located in the angular portion of said bed, and means connected with the table for vertical adjustment of said table.

13. A paper-box turning-in or tucking-in machine comprising an angularly formed supporting bed, brackets mounted upon said bed, and a bearing-portion carried by each bracket, shafts mounted in said bearing-portions, means for actuating said shafts, heads slidably mounted with relation to said shafts and the bed for adjustment upon said bed, each head comprising a base and a pair of side-walls, means for securing said heads in their adjusted positions consisting of elongated slots with which the bed is provided, bolts disposed in said slots, said bolts extending into and through perforations in the base of each head, and a tightening nut upon each bolt, a tucking-in finger oscillatorily disposed between said side-walls, an eccentric slidably disposed upon each shaft but rotating therewith, means between each eccentric and each tucking-in finger for actuating the same, and a table conforming to and located in the angular portion of said bed.

14. A paper-box turning-in or tucking-in machine comprising an angularly formed supporting bed, brackets mounted upon said bed, and a bearing-portion carried by each bracket, shafts mounted in said bearing-portions, means for actuating said shafts, heads slidably mounted with relation to said shafts and the bed for adjustment upon said bed, each head comprising a base and a pair of side-walls, means for securing said heads in their adjusted positions consisting of elongated slots with which the bed is provided, bolts disposed in said slots, said bolts extending into and through perforations in the base of each head, and a tightening nut upon each bolt, a tucking-in finger oscillatorily disposed between said side-walls, an eccentric slidably disposed upon each shaft but rotating therewith, means between each eccentric and each tucking-in finger for actuating the same, a table conforming to and located in the angular portion of said bed, and means connected with the table for vertical adjustment of said table.

15. A paper-box turning-in or tucking-in machine comprising an angularly formed supporting bed, brackets mounted upon said bed, and a bearing-portion carried by each bracket, shafts mounted in said bearing-portions, intermeshing gears connecting said shafts for conveying the motion of one shaft to another shaft, heads slidably mounted with relation to said shafts and the bed for adjustment upon said bed, each head comprising a base and a pair of side-walls, means for securing said heads in their adjusted positions consisting of elongated slots with which the bed is provided, bolts disposed in said slots, said bolts extending into and through perforations in the base of each head and a tightening nut upon each bolt, a tucking-in finger oscillatorily disposed between said side-walls, an eccentric slidably disposed upon each shaft but rotating therewith, means between each eccentric and each tucking-in finger for actuating the same, and a table conforming to and located in the angular portion of said bed.

16. A paper-box turning-in or tucking-in machine comprising an angularly formed supporting bed, brackets mounted upon said bed, and a bearing-portion carried by each bracket, shafts mounted in said bearing-portions, intermeshing gears connecting said shafts for conveying the motion of one shaft to another shaft, heads slidably mounted with relation to said shafts and the bed for adjustment upon said bed, each head comprising a base and a pair of side-walls, means for securing said heads in their adjusted positions consisting of elongated slots with which the bed is provided, bolts disposed in said slots, said bolts extending into and through perforations in the base of each head, and a tightening nut upon each bolt, a tucking-in finger oscillatorily disposed between said side-walls, an eccentric slidably disposed upon each shaft but rotating therewith, means between each eccentric and each tucking-in finger for actuating the same, a table conforming to and located in the angular portion of said bed, and means connected with the table for vertical adjustment of said table.

17. In a paper-box turning-in or tucking-in machine, a supporting element comprising an angularly-formed supporting portion, a tucking-in head and fingers mounted upon said angularly formed supporting portion, and a table for the reception of a box or cover, said supporting portion being provided with right-angled walls against which the said box or cover is adapted to be pressed.

18. In a paper-box turning-in or tucking-in machine, a supporting element comprising an angularly-formed supporting portion, a tucking-in head and finger, mounted upon said angularly formed supporting portion, and a table for the reception of a box or cover, said supporting portion being provided with right-angled walls and resilient cushions mounted upon the faces of said right-angled walls against which the said box or cover is adapted to be pressed.

19. A paper-box turning-in or tucking-in machine comprising an angularly formed tucking-in finger supporting bed, said bed being provided with marginal guide-elements, heads mounted upon said bed between the guide-elements thereof, said heads being provided with tucking-in fingers, and a work-supporting table beneath said fingers, said table conforming to and located within the included angle of said bed, and means connected with the table for vertical adjustment of said table.

20. A paper-box turning-in or tucking-in machine comprising an angularly formed tucking-in finger supporting bed, said bed being provided with marginal guide-elements, heads slidably and adjustably disposed upon said bed between the guide-elements thereof, said heads being provided with tucking-in fingers, means for securing said heads in their adjusted positions, and a work-supporting table beneath said fingers, said table conforming to and located within the included angle of said bed.

21. A paper-box turning-in or tucking-in machine comprising an angularly formed tucking-in finger supporting bed, said bed being provided with marginal guide-elements, heads slidably and adjustably disposed upon said bed between the guide-elements thereof, said heads being provided with tucking-in fingers, means for securing said heads in their adjusted positions, a work-supporting table beneath said fingers, said table conforming to and located within the included angle of said bed, and means connected with the table for vertical adjustment of said table.

22. In a paper-box turning-in or tucking-in machine, in combination with a supporting element, a tucking-in head comprising a base and upwardly extending side-walls, a turning-in or tucking-in finger oscillatorily mounted between said side-walls, a shaft extending across the space between said side-walls and through openings with which the said side-walls are provided, an eccentric mounted upon said shaft, and means between said eccentric and the said tucking-in finger for actuating the same.

23. In a paper-box turning-in or tucking-in machine, in combination with a supporting element, a tucking-in head comprising a base and upwardly extending side-walls, a turning-in or tucking-in finger oscillatorily mounted between said side-walls, and means also mounted between said side-walls for actuating said finger, said tucking-in finger having a portion extending from between the said side-walls, said portion having a recessed part, a smoothing-out bar disposed in said recessed part, and means for securing said bar to said portion of the tucking-in finger.

24. In a paper-box turning-in or tucking-in machine, in combination with a supporting element, a tucking-in head comprising a base and upwardly extending side-walls, a pivot-pin connected with said walls, said pin extending across the space between said walls, each wall being also provided with a cam-way, a link mounted upon said pin, a yoke-shaped turning-in finger pivotally connected with said link, a rod connected with said finger, said rod having portions projecting from the sides of said finger and extending into and being movably disposed in said camways, and means also mounted between said side-walls for actuating said finger.

25. In a paper-box turning-in or tucking-in machine, in combination with a supporting element, a tucking-in head comprising a base and upwardly extending side-walls, a pivot-pin connected with said walls, said pin extending across the space between said walls, each wall being also provided with a cam-way, a link mounted upon said pin, a yoke-shaped turning-in finger pivotally connected with said link, a rod connected with said finger, said rod having portions projecting from the sides of said finger and extending into and being movably disposed in said camways, a shaft extending across the space between said side-walls and through openings with which the said side-walls are provided, an eccentric mounted upon said shaft, and means between said eccentric and the said tucking-in finger for actuating the same.

26. In a paper-box turning-in or tucking-in machine, in combination with a supporting element, a tucking-in head comprising a base and upwardly extending side-walls, a pivot-pin connected with said walls, said pin extending across the space between said walls, each wall being also provided with a camway, a link mounted upon said pin, a yoke-shaped turning-in finger pivotally connected with said link, a rod connected with said finger, said rod having portions projecting from the sides of said finger and extending into and being movably disposed in said camways, means also mounted between said side-walls for actuating said finger, said tucking-in finger having a portion extending from between the said side-walls, said portion having a recessed part, a smoothing-out bar disposed in said recessed part, and means for securing said bar to said portion of the tucking-in finger.

27. In a paper-box turning-in or tucking-in machine, in combination with a supporting element, a tucking-in head comprising a base and upwardly extending side-walls, a pivot-pin connected with said walls, said pin extending across the space between said walls, each wall being also provided with a camway, a link mounted upon said pin, a yoke-shaped turning-in finger pivotally connected with said link, a pair of rods connected with said finger, one of said rods having portions projecting from the sides of said finger and extending into and being movably disposed in said camways, said other rod being provided with a perforation, a shaft extending across the space between said side-walls and through openings with which the said side-walls are provided, an eccentric mounted upon said shaft, said eccentric having a strap, a stem connected with said strap, said stem extending into and through the perforation of the said last-mentioned rod of the finger, and a cushioning spring encircling said stem.

28. In a paper-box turning-in or tucking-in machine, in combination with a supporting element, a tucking-in head comprising a base and upwardly extending side-walls, a pivot-pin connected with said walls, said pin extending across the space between said walls, each wall being also provided with a camway, a link mounted upon said pin, a yoke-shaped turning-in finger pivotally connected with said link, a pair of rods connected with said finger, one of said rods having portions projecting from the sides of said finger and extending into and being movably disposed in said camways, said other rod being provided with a perforation, a shaft extending across the space between said side-walls and through openings with which the said side-walls are provided, an eccentric mounted upon said shaft, said eccentric having a strap, a stem connected with said strap, said stem extending into and through the perforation of the said last-mentioned rod of the finger, a cushioning spring encircling said stem, said tucking-in finger having a portion extending from between the said side-walls, said portion having a recessed part, a smoothing-out bar disposed in said recessed part, and means for securing said bar to said portion of the tucking-in finger.

29. A paper-box turning-in or tucking-in machine comprising a support provided with a plurality of angularly disposed members, a plurality of heads mounted upon said members, each head being provided with a tucking-in finger, combined with a plurality of box or cover-receiving tables.

30. A paper-box turning-in or tucking-in machine comprising a support provided with a plurality of angularly disposed members, a plurality of heads mounted upon said members, each head being provided with a tucking-in finger, combined with a plurality of box or cover-receiving tables, and means connected with said tables for separate vertical adjustment of each table.

31. A paper-box turning-in or tucking-in machine comprising a support provided with a plurality of angularly disposed members, a plurality of heads slidably mounted upon said members for adjustment of said heads with relation to said support, each head being provided with a tucking-in finger, combined with a plurality of box or cover-receiving tables.

32. A paper-box turning-in or tucking-in machine comprising a support provided with a plurality of angularly disposed members, a plurality of heads slidably mounted upon said members for adjustment of said heads with relation to said support, each head being provided with a tucking-in finger, combined with a plurality of box or cover-receiving tables, and means connected with the table for vertical adjustment of said table.

In testimony that I claim the invention set forth above I have hereunto set my hand this 22nd day of October, 1917.

RAYMOND S. WESTERVELT.

Witnesses:
FRED'K C. FRAENTZEL,
FRED'K H. W. FRAENTZEL.

Copies of this patent may be obtained for five cents each, by addressing the "Commissioner of Patents, Washington, D. C."